(12) United States Patent
Oroskar et al.

(10) Patent No.: US 9,949,195 B1
(45) Date of Patent: Apr. 17, 2018

(54) CONTENTION-FREE MOBILE ACCESS FOR HANDOVER TO A RELAY BASE STATION WITH WIRELESS BACKHAUL

(71) Applicant: Sprint Spectrum L.P., Overland Park, KS (US)

(72) Inventors: Siddharth S. Oroskar, Overland Park, KS (US); Jasinder P. Singh, Olathe, KS (US); Rajil Malhotra, Olathe, KS (US); Nitesh Manchanda, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 110 days.

(21) Appl. No.: 14/969,120

(22) Filed: Dec. 15, 2015

(51) Int. Cl.
| | | |
|---|---|---|
| *H04J 3/08* | (2006.01) | |
| *H04W 36/22* | (2009.01) | |
| *H04W 74/08* | (2009.01) | |
| *H04B 7/155* | (2006.01) | |

(52) U.S. Cl.
CPC ........ *H04W 36/22* (2013.01); *H04B 7/15592* (2013.01); *H04W 74/0833* (2013.01)

(58) Field of Classification Search
CPC . H04W 36/14; H04W 36/30; H04W 72/1215; H04W 72/1231; H04W 88/06; H04W 48/18; H04W 84/12; H04L 5/00
USPC .......................... 370/230–315; 455/404–450
See application file for complete search history.

(56) References Cited

U.S. PATENT DOCUMENTS

| | | | | |
|---|---|---|---|---|
| 8,184,594 B2* | 5/2012 | Li | ..................... | H04W 36/0055 370/329 |
| 8,218,500 B2* | 7/2012 | Kangude | .......... | H04W 36/0072 370/331 |
| 8,223,791 B2* | 7/2012 | Meyer | ............... | H04W 74/0833 370/462 |
| 8,305,964 B2* | 11/2012 | Fischer | ............... | H04W 74/004 370/328 |
| 8,504,046 B2* | 8/2013 | Amirijoo | .......... | H04W 36/0055 370/331 |
| 8,509,180 B2* | 8/2013 | Maheshwari | ......... | H04W 76/02 370/331 |
| 8,554,221 B2* | 10/2013 | Dalsgaard | ......... | H04W 36/0055 455/436 |
| 8,687,590 B2* | 4/2014 | Cai | ................... | H04W 36/0033 370/331 |

(Continued)

FOREIGN PATENT DOCUMENTS

WO    WO2009051534 A1    4/2009

*Primary Examiner* — Man Phan

(57) ABSTRACT

A method and system for handover of a wireless communication device (WCD) from a source base station to a target base station that is a relay base station. The source base station may engage in procedure to handover the WCD to the target base station. A determination may be made as to whether or not the target base station is a relay base station with a wireless backhaul. If the target base station is determined to be a relay base station with a wireless backhaul, then the source base station may transmit to the WCD on an air interface a message containing a particular identifier for use by the WCD in a contention-free random access request to the source base station. In the event that the handover fails, the WCD may make a contention-free random access request to the source base station to regain access through the source base station.

20 Claims, 7 Drawing Sheets

(56) References Cited

U.S. PATENT DOCUMENTS

| | | | | |
|---|---|---|---|---|
| 8,774,135 B2* | 7/2014 | Narasimha | H04W 36/0055 |
| | | | 370/328 |
| 8,781,471 B2* | 7/2014 | Fischer | H04W 36/0072 |
| | | | 370/329 |
| 8,811,993 B2* | 8/2014 | Alonso-Rubio | H04W 36/08 |
| | | | 370/312 |
| 9,084,102 B1* | 7/2015 | Singh | H04W 4/22 |
| 9,277,465 B1* | 3/2016 | Oroskar | H04W 36/0072 |
| 9,491,766 B2* | 11/2016 | Peng | H04B 7/15528 |
| 9,560,675 B2* | 1/2017 | Webb | H04W 74/0833 |
| 9,609,688 B2* | 3/2017 | Prakash | H04W 76/068 |
| 2014/0369318 A1* | 12/2014 | Adjakple | H04B 7/155 |
| | | | 370/331 |
| 2016/0338087 A1* | 11/2016 | Ratasuk | H04W 72/0446 |

\* cited by examiner

CONTENTION-FREE MOBILE ACCESS FOR HANDOVER TO A RELAY BASE STATION WITH WIRELESS BACKHAUL

BACKGROUND

Unless otherwise indicated herein, the description provided in this section is not itself prior art to the claims and is not admitted to be prior art by inclusion in this section.

A typical wireless network includes a number of base stations each radiating to provide coverage in which to serve wireless communication devices (WCDs) such as cell phones, tablet computers, tracking devices, embedded wireless modules, and other wirelessly equipped devices. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

Depending on the specific underlying technologies and architecture of a given wireless communication network, base stations may take different forms. In a code division multiple access (CDMA) system configured to operate according IS-2000 and IS-856 standards, for example, a base station may include a base transceiver system (BTS) under the control of a base station controller (BSC). In a universal mobile telecommunications system (UMTS) configured to operate according to ITU IMT-2000 standards, the base station is usually referred to as a NodeB, and is usually under the control of a radio network controller (RNC). In a UMTS network configured to operate to Long Term Evolution (LTE) standards, evolved NodeBs (eNodeBs) may communicate directly with one another, while under functional coordination of a mobility management entity (MME). Other base station architectures and operational configurations are possible as well.

Further, a wireless network may operate in accordance with a particular air interface protocol (i.e., radio access technology), with communications from the base stations to WCDs defining a downlink or forward link and communications from the WCDs to the base stations defining an uplink or reverse link. Examples of existing air interface protocols include, without limitation, wireless wide area network (WWAN) protocols such as Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1xRTT and 1xEV-DO), and Global System for Mobile Communications (GSM), and wireless local area network (WLAN) protocols such as IEEE 802.11 (WIFI), BLUETOOTH, and others. Each protocol may define its own procedures for registration of WCDs, initiation of communications, handover or handoff between coverage areas, and other functions related to air interface communication.

In practice, a base station, such as an eNodeB, may be configured to provide service to WCDs on multiple carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

Each carrier may also define various logical channels to facilitate communication between the base station and one or more served WCDs. For instance, on the downlink, a carrier may define a reference channel on which the base station broadcasts a reference signal useable by WCDs to detect and evaluate coverage, various other downlink control channels to carry control signaling (such as resource-scheduling directives) to WCDs, and one or more shared or traffic channels for carrying bearer data (e.g., user or application level data) to WCDs. And on the uplink, a carrier may define one or more uplink control channels to carry control signaling (such as resource scheduling requests, channel state reports, and the like) from WCDs, and one or more shared or traffic channels for carrying bearer data from WCDs. In practice, the shared or traffic channels may define particular physical resources for carrying data between the base station and WCDs.

When a WCD enters into coverage of a base station, the WCD may attach, register, or otherwise associate with the base station, and the base station may then serve the WCD on one or more carriers. The base station may then be referred to as the WCD's "serving" base station. Herein, the term "serving" will, in general, be used to describe a particular base station as such only when it is not otherwise apparent from context. In practice, the process of serving the WCD may involve the serving base station allocating use of particular air interface resources, such as traffic channels or portions thereof, to carry data communications to and from the WCD, and managing transmission on those resources, such as controlling what modulation scheme is used for the transmissions.

For instance, when the serving base station has data to transmit to the WCD, the serving base station may select certain downlink resources to carry the data and may determine a modulation scheme for transmission on those resources, and the base station may then (i) transmit to the WCD a scheduling directive instructing the WCD to receive the data on the scheduled resources using the determined modulation scheme, and (ii) transmit the data on the indicated downlink resources using the determined modulation scheme. Likewise, when the serving base station receives from the WCD a request for the WCD to transmit data to the base station, the base station may select certain uplink resources to carry the data and may determine a modulation scheme for transmission on those resources, and the base station may then (i) transmit to the WCD a scheduling directive instructing the WCD to transmit the data on the scheduled resources using the determined modulation scheme and (ii) receive the transmission from the WCD accordingly.

A WCD may also move between neighboring coverage areas of base stations. More specifically, as a WCD moves between wireless coverage areas of a wireless communication system, or when network conditions change or for other reasons, the WCD may "handover" (or "hand off") from operating in one coverage area (e.g., a serving coverage area) to operating in another coverage area. In a usual case, this handover process is triggered by the WCD monitoring the signal strength of various nearby available coverage areas, and the serving base station (or some other controlling network entity) determining when one or more threshold criteria are met. For instance, a WCD may continuously monitor signal strength from various available coverage areas and notify its serving base station when a given coverage area has a signal strength that is sufficiently higher than that of the serving base station. The serving base station (or some other controlling network entity) may then direct the WCD to handover to the base station of the given coverage area. By convention, a WCD is said to handover from a "source" base station (or source coverage area) to a "target" base station (or target coverage area). At the time that a handover is triggered, the source base station is the WCD's serving base station.

OVERVIEW

Communications from a base station to a WCD are carried on a "forward link" (e.g., in a CDMA system) or "downlink" (e.g., in a UMTS/LTE network) of an air interface between the WCD and base station, and communications from a WCD to the base station are carried on "reverse link" (e.g., in a CDMA system) or "uplink" (e.g., in a UMTS/LTE network) of the air interface. By way of example, the discussion herein will be made with reference to LTE, and the terms downlink and uplink will therefore be adopted. However, it should be understood that discussion applies as well to forward and reverse links. As noted above, an LTE base station may take the form of an eNodeB.

While communications are generally scheduled by the base station, initiation of communication from a WCD to a base station can involve at least one unscheduled transmission from the WCD to the base station. In accordance with the air interface protocol, the base stations may provide for a shared access channel on which unscheduled messages can be sent from WCDs to the base station, for example to request access to the network for further communications. Such requests are said to be "random" in the sense they generally occur on a random basis with respect to scheduled transmissions. Once such an initial unscheduled transmission is received, the base station can then allocate initial uplink and/or downlink resources to communicate with the WCD as necessary to manage further communications. In particular, the WCD may use the initial uplink resources to send information regarding the quantity of network resources sought by the WCD. Such a communication from the WCD is referred to as a service request. The base station can then allocate sufficient network resources to accommodate the service request and send an indication of the allocation to the WCD.

Considering again the example of LTE, an eNodeB can provide a random access channel on its uplink to accommodate requests for network access made on a random basis by WCDs. More specifically, the eNodeB can inform WCDs of the random access channel and of a finite pool of unique identifiers that can be used for making random access requests. When a WCD wants to make a random access request it can select one of the identifiers and transmit it to the eNodeB on the random access channel. Because there is no guarantee that two or more WCDs won't select the same identifier when making concurrent random access requests, it can happen that the two or more concurrent, identical requests will "collide." This circumstance is generally referred to as "contention," and the procedure of using a finite pool of identifiers for making random access requests on a shared random access channel is referred to as "contention-based random access." As discussed below, the outcome of a specific instance of contending random access requests can depend on whether any one of them can be successfully received by the eNodeB, among other factors. However, contention-based random access can, in general, be a contributing factor in service latency, delay, or other forms of service degradation, depending on network load relative to the size of the pool of identifiers, for example.

In order to help improve the likelihood of success of certain types of random access requests for which latency and/or service degradation may be deemed undesirable, an eNodeB can reserve a subset of the pool of identifiers for specific assignment to WCDs for "contention-free" random access requests. A given WCD can be guaranteed that an identifier assigned to it by the eNodeB, instead of one selectable at random from the pool available to other WCDs, will not be subject to contention. Providing a WCD a contention-free random access request to a target base station during handover can be particularly beneficial in helping ensure success of the handover procedure by increasing the likelihood that the target base station will receive the request and respond in a timely manner.

As described below, some wireless communication networks (e.g., under LTE) support one or another form of "relay base station" in which a WCD (possibly in conjunction with an auxiliary application or device) can function as a small base station for other WCDs within its wireless range. The WCD of a relay base station is referred to as a "relay WCD." In such a case, instead of having a dedicated backhaul link to the wireless network, the relay base station has a wireless backhaul supported by, or overlaid on, an air interface connection between its relay WCD and the relay WCD's serving base station. Thus, for a relay base station, the types of traffic usually supported on "backhaul" connections between a base station and the network are supported on the wireless backhaul.

Because the wireless backhaul shares the air interface of a relay WCD with other scheduled and unscheduled wireless communications of the relay WCD, signaling related to a handover involving a relay base station may be subject to latency and delay not typically occurring on wireline backhauls of (non-relay) network base stations. In particular, if the target base station of a handover is a relay base station, delay or latency of handover signaling can exceed that which contention-free random access is intended to mitigate. As a result, handover of a WCD to a relay target base station may fail, in which case the WCD may then attempt seek regaining access from the source base station. However, under conventional operation, the WCD may have to engage in contention-based random access with the source base station, which may introduce further delay in recovery from the failed handover and exacerbate any service degradation already incurred. It would therefore be desirable to ensure that a WCD may be afforded contention-free random access to its source base station in the event that handover to a relay target base station fails.

Hence, in one respect, various embodiments of the present invention provide a method of handover of a wireless communication device (WCD) from a source base station in a wireless communication network to a target base station in the wireless communication network, the method comprising: the source base station engaging in a procedure to handover the WCD from the source base station to the target base station; making a determination that the target base station is a relay base station with a wireless backhaul connection to the wireless communication network; and in response to making the determination, the source base station transmitting to the WCD on an air interface a message containing a particular identifier for use by the WCD in a contention-free random access request to the source base station.

In another respect, various embodiments of the present invention provide a base station configured for operating in a wireless communication network and for providing service to a wireless communication device (WCD), the base station comprising: an air interface for wireless communications with one or more WCDs; one or more processors; memory accessible by the one or more processors; and machine-readable instructions stored in the memory, that upon execution by the one or more processors cause the base station to carry out operations including: engaging in a procedure to handover the WCD from the base station to a target base station of the wireless communication network, making a determination that the target base station is a relay base station with a wireless backhaul connection to the wireless communication network, and in response to making the determination, transmitting to the WCD on an air interface a message containing a particular identifier for use by the WCD in a contention-free random access request to the base station.

In still another respect, various embodiments of the present invention provide a non-transitory computer-readable medium having instructions stored thereon that, upon execution by one or more processors of a base station configured for operating in a wireless communication network and for providing service to a wireless communication device (WCD), cause the base station to carry out operations including: engaging in a procedure to handover the WCD from the base station to a target base station of the wireless communication network; making a determination that the target base station is a relay base station with a wireless backhaul connection to the wireless communication network; and in response to making the determination, transmitting to the WCD on an air interface a message containing a particular identifier for use by the WCD in a contention-free random access request to the base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE as an example air interface protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
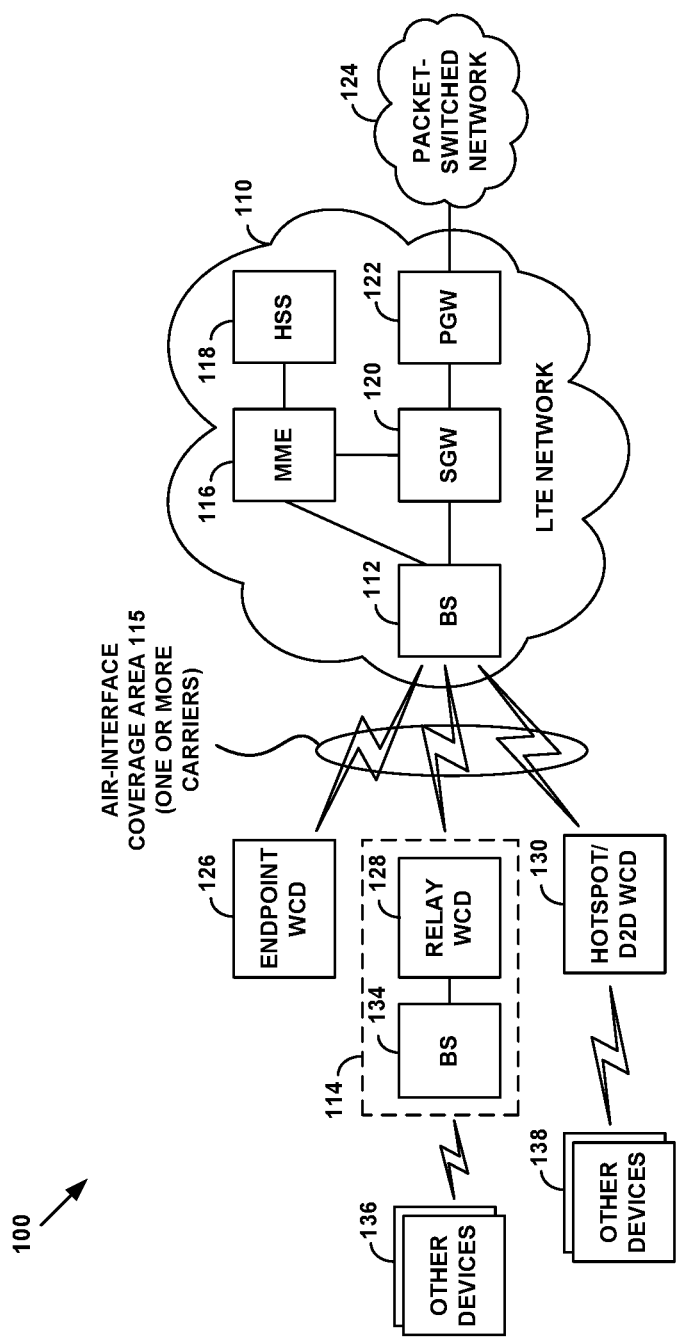
FIG. 1 is a simplified block diagram of a wireless communication system in which the present method and system can be implemented.

Referring to the drawings, as noted above, FIG. 1 is a simplified block diagram of a wireless communication system 100 in which the present method and system can be implemented. In particular, FIG. 1 depicts a representative LTE network 110, which functions primarily to serve WCDs with wireless packet data communication service, including possibly voice-over-packet service, but may also provide other functions. As shown, the LTE network 110 includes a base station (LTE eNodeB) 112, which has an antenna structure and associated equipment for providing an LTE coverage area 115 in which to serve the WCDs. The base station 112 then has a communication interface with a mobility management entity (MME) 116 that functions as a signaling controller for the LTE network 110 and has a communication interface with a home subscriber server (HSS) 118. Further, the base station 112 has a communication interface with a serving gateway (SGW) 120, which in turn has a communication interface with a packet-data-network gateway (PGW) 122 that provides connectivity with a packet-switched network 124 such as the Internet, and the MME 118 has a communication interface with the SGW 120. In practice, the illustrated components of the LTE network 110 may sit as nodes on a private packet-switched network owned by an operator of the LTE network 110, and thus the various communication interfaces may be logical interfaces within that network.

In addition, FIG. 1 illustrates three example WCDs 126, 128, 130 being served by the base station 112 over air interface 115 (e.g., within a particular coverage area of the base station). WCD 126 is typical end-user WCD such as a cell phone or wirelessly-equipped computer, tablet, or other device that does not provide connectivity for at least one other device. WCDs 128 and 130, on the other hand, are WCDs that provide connectivity for at least one other device. In particular, WCD 128 is connected, configured, or otherwise arranged as a relay WCD coupled or integrated with a small cell base station (also referred to as a "mini-macro base station") 134 or the like in a relay base station 114, that is in turn configured (similar to base station 112) to serve other devices 136. So WCD 128 functions as an intermediary between base station 112 and any devices served by small cell base station 134, with the air interface connection between WCD 128 and base station 112 functioning as a wireless backhaul link for the small cell base station 134. And WCD 130 is configured as a hotspot or device-to-device (D2D) WCD (such as a cell phone having a personal-hotspot feature), similar to the relay WCD, to function as an intermediary between base station 112 and one or more other devices 138. In these configurations, the base station 112 is sometimes referred to as a "donor" base station.

In practice, when any such WCD enters into coverage of base station 112, the WCD may engage in a process to attach with, handover to, or otherwise associate with the base station, which may result in establishment of a radio link layer connection (e.g., radio resource control (RRC) connection) over the air between the WCD and the base station and preparation of the network to facilitate serving the WCD. For instance, the WCD may transmit an attach request to the base station, which the base station may forward to the MME, and the MME may then engage in signaling to control setup of one or more bearers for carrying data for the WCD between the PGW and the base station. The base station 112 may also establish a tunnel ("S1-U" tunnel in LTE) to the SGW 120 for the WCD, as well as for other served WCDs. Further, in this attach process, the WCD may convey to the base station information about the WCD's profile and configuration, and the MME may also receive WCD profile and configuration information from the HSS and convey that information to the base station, and the base station may store this information in a local context record for the WCD.

The base station may then serve the WCD, scheduling downlink and uplink communications as discussed above for instance. In particular, if the base station receives from the SGW data to be transmitted to the WCD, the base station may schedule and engage in transmission of the data to the WCD using an appropriate modulation scheme. And if the WCD requests transmission of data to the base station, the base station may schedule transmission of the data from the WCD using an appropriate modulation scheme, and the WCD may transmit the data accordingly.

Further, if a WCD provides connectivity for one or more other devices, the radio link layer connection between the WCD and the base station 112 may also carry signaling and bearer data related to each such other device. For instance, considering relay WCD 128, the small cell base station 134 may operate as a base station of the LTE network, but its communications with other entities in the LTE network (such as with an SGW and MME) would occur via the relay WCD 128 and via the radio link layer connection between the relay WCD 128 and the base station 112. Thus, when data is to be transmitted from the LTE network to a device served by the small cell base station 134, base station 112 would schedule and transmit that data over the air to the relay WCD 128, the relay WCD 128 would then pass the data to the small cell base station 134, and the small cell base station 134 would then schedule and transmit the data over the air to the served device. Likewise, when a device served by the small cell base station 134 transmits data to the small cell base station 134 for transmission on the packet-switched network 124, the small cell base station 134 would then pass the data to the relay WCD 128, and the relay WCD 128 would then work with base station 112 to facilitate transmission of the data over the air to base station 112. A similar but simpler arrangement may apply as well with a hotspot/D2D WCD.

As discussed briefly above, downlink communications in wireless communication system, such as network 100, are generally scheduled by a base station, while communications on the uplink can usually involve at least some unscheduled transmissions from WCDs to a base station. In particular, base stations may provide for a shared access channel on which random access requests can be sent from WCDs to the base station. Additionally, a shared access channel can be configured to support procedures for contention-based random access, contention-free random access, or both. Once a random access request is received, the base station can then allocate initial uplink and/or downlink resources to communicate with the WCD as necessary to manage further communications.

For purposes of illustration, and by way of example, the random access procedure can be described in connection with operations and procedures in accordance with LTE Advanced. Initially, an eNodeB broadcasts system information that specifies its random access channel, referred to in LTE as a "physical random access channel" ("PRACH"). For example, the system information may specify time-frequency windows (e.g., "resource blocks" in LTE) designated for unscheduled transmissions on its PRACH, as well as other network information (e.g., network capabilities, synchronization information, etc.). The unscheduled transmissions made by WCDs—e.g., random access requests—can each include an identifier for differentiating transmissions received in the same time-frequency window. In accordance with LTE, identifiers for random access requests are referred to as "RA radio network temporary identifiers" ("RA-RNTIs"), or sometimes just called "RACH preambles codes," "RACH preamble," or just "preambles." A given eNodeB can have finite set or list of different RA-RNTIs (e.g., 64 different values), and can include the list in its broadcast the system information.

In contention-based random access, WCDs in the coverage area of an eNodeB can detect the system information broadcast, at any time randomly select a RA-RNTI from the list provided by the eNodeB, and send a message using the selected preamble code to the eNodeB over the PRACH. The preamble codes are configured such that the eNodeB is able to use code differentiation (e.g., code division multiplexing) to resolve concurrently received preamble messages with different preamble codes.

When the eNodeB receives and successfully decodes the preamble code, it responds by sending a random access response (RAR) during a response window that is based on the time-frequency window used to send the initial preamble code. As a result, all WCDs that sent respective preamble codes during a given time-frequency window monitor the same response window. A given RAR may therefore include data addressed to each of the preamble codes received in the preceding PRACH time-frequency window. For example, the RAR may include indicators for each of the preamble codes the eNodeB received, and the WCD(s) that used those codes for their random access messages then use the indicators to identify the data addressed to them. If a given WCD does not identify an indicator corresponding to the preamble code used by that WCD (such as may occur if the preamble code could not be decoded by the eNodeB due to interference or otherwise), the WCD can restart the random access procedure by selecting a new preamble code and transmitting another preamble message over the PRACH.

For a WCD that does identify an indicator corresponding to their selected preamble code in the RAR, the data addressed to the UE may include an assignment of initial control channel uplink and downlink resources to allow the WCD to exchange further information with the eNodeB. In addition, the RAR can assign a "temporary cell radio network temporary identifier" ("C-RNTI") to identify the WCD in subsequent communications, and can also indicate a timing offset for the WCD to use to account for propagation delays to the eNodeB or to otherwise synchronize uplink communications.

The WCD uses the uplink resources assigned in the RAR and sends the eNodeB a connection request. Among other information, the connection request may include a unique identifier for the UE (e.g., a temporary mobile subscriber identity (TMSI), a previously assigned C-RNTI, a random number, or another unique identifier). The WCD then monitors the downlink resource granted in the RAR for a response from the eNodeB. The eNodeB responds with a contention resolution message that includes the UE's unique identifier. Receiving a matched unique identifier in the contention resolution message provides confirmation that the UE's connection request was received by the eNodeB.

Because the set of preamble codes for a given eNodeB is finite, and because they are independently randomly selected by the WCDs requesting random access from the given eNodeB, it is possible for multiple WCDs to select the same preamble code for use during the same time window. When this happens, one or more random access messages can interfere with one another and result in contention, as previously noted. If one of the interfering preamble messages is stronger than the others, the eNodeB may still be able to successfully decode the message with the strongest signal despite the increased noise from the others. But if none of the interfering preamble messages are significantly stronger than the others, the eNodeB may fail to decode any of them.

The contention resolution message resolves the contention due to the possibility of multiple WCDs using the same preamble code. If a WCD receives a contention resolution message that does not match its unique identifier, the WCD discards its temporary C-RNTI and restarts the random access procedure by selecting a new preamble code and transmitting another random access request over the PRACH. The WCD that passed contention resolution (i.e., that received back its matching unique identifier) promotes its temporary C-RNTI to a full C-RNTI for use in subsequent communications with the eNodeB, and continues exchanging messages with the base station as necessary to setup a connection.

Contention-based random access can be appropriate in circumstances for which some degree of delay or latency in access is acceptable or tolerable. For example, a WCD requesting a connection to send or receive email might be able to tolerate some delay in gaining network access. In other circumstances, delay or latency may not be acceptable, or may be less tolerable. In particular, when a UE hands over from a source eNodeB to a target eNodeB, it typically must first request and be granted access from the target eNodeB. Delay in such a random access request can lead to a dropped call or data session, or other form of service degradation.

In order to help mitigate potential delay or latency in servicing random access requests made during handover, or other circumstances in which delay or latency are undesirable, a given eNodeB can reserve one or more of its preamble codes (RA-RNTIs) for assignment to specific WCDs. More particularly, by assigning a particular preamble code to only a specific WCD, the eNodeB can assure that the specific WCD's random access request will not be subject to contention. Thus, such random access requests are referred to as contention-free random access requests, and the preamble codes reserved for contention-free random access requests are referred to as contention-free preamble codes (or more generally, contention-free identifiers for random access requests). In assigning a contention-free preamble to a WCD, an eNodeb can be considered to reserve the contention-free preamble for use by the WCD.

The typical aim of contention-free random access in handover of a WCD is to help ensure that the WCD gets timely access to the target base station. This is because part of a handover involves release by the source base station of air interface resources that provide the WCD with access to the source base station. Delay or failure in the WCD's random access request to the target base station can therefore be disruptive to the WCD's communications during handover.

Returning again to the example of LTE, a handover may be triggered when a WCD reports to its source eNodeB detection of a target eNodeB at a sufficient signal-strength level. Upon receiving the report, the source eNodeB engages in signaling with the target eNodeB via an interface referred to in LTE as an "X2" interface, which provides a direct communicative connection or link between LTE base stations. The source eNodeB then sends a handover command to the WCD directing it to transition to being served by the target eNodeB. The source eNodeB also tears down its RRC connection with the WCD and engages in signaling with the MME to switching the WCD's S1-U tunnel with the SGW from the source eNodeB to the target eNodeB. Responding to the command from the target eNodeB, the WCD engages in access and connection procedures with target eNodeB, so that the target eNodeB can serve the WCD.

In conventional operation, the target eNodeB may convey a contention-free preamble code or identifier to the source eNodeB via the X2 connection for use by the WCD, so that the WCD can make a contention-free random access request to the target eNodeB during the handover. The source eNodeB can then provide the contention-free preamble to the WCD in the handover command. By using the contention-free preamble code, the WCD may be assured a higher probability of success in gaining access to the target eNode, and thereby having a successful handover.

Figure 2:
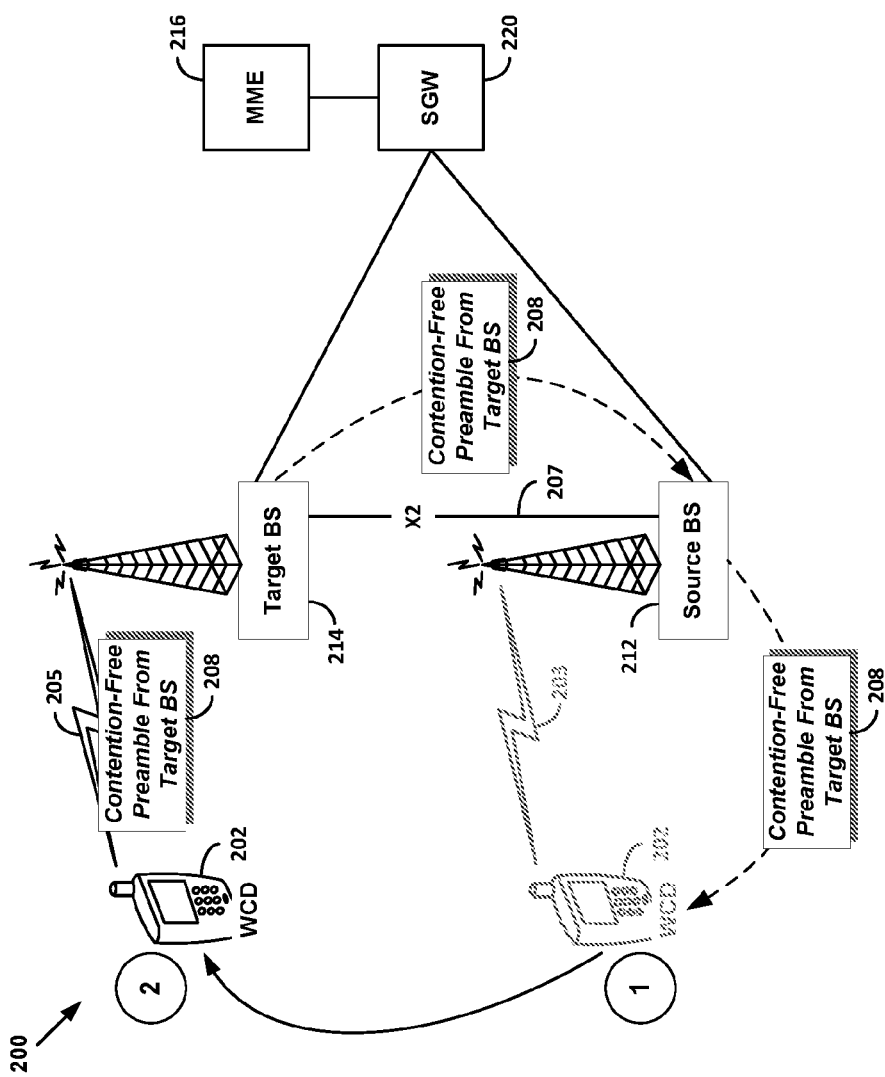
FIG. 2 illustrates handover operation in an example scenario.

FIG. 2 illustrates a handover operation in a wireless network 200 in accordance with an example scenario. By way of example, the wireless network 200 includes two base stations 212 and 214 connected to each other with an X2 link 207, and each connected to a SWG 220, which in turn is connected to a MME 216. For the sake of brevity in FIG. 2, other LTE network elements, such as those illustrated in FIG. 1 (e.g., HSS and PGW), have been omitted. The network 200 also includes a WCD 202 shown, for the purposes of illustration, at two locations meant to represent pre-handover and post-handover operation (as well as possibly intra-handover operation). As a visual cue of the handover, the WCD 202 is depicted in faded gray lines at its pre-handover location, and in dark black lines at its post-handover location.

Also for purposes of illustration, the base station 212 is taken to be the source base station of the handover operation, and the base station 214 is taken to be the target base station of the handover operation. Thus, at the time the handover operation is initiated, designated by a circular label bearing the number "1," the source base station 212 is the serving base station of the WCD 202 (and WCD 202 is depicted at its pre-handover location); communications between the source base station 212 and the WCD 202 are supported on the air interface 203, as represented in the figure. As described above, the source base station 212 may engage in handover signaling with the target base station 214 via the X2 link 207, during which the target base station may convey a contention-free preamble 208 to the source base station, as indicated. The source base station may then convey the contention-free preamble 208 to the WCD 202 in a handover command, also shown.

The WCD 202 may then engage in access and connection procedures with target base station 214, including sending a contention-free random access request using the contention-free preamble 208, also as indicated. The access and connection procedure is designated by a circular label bearing the number "2." After handover (represented by WCD 202 at its post-handover location), communications between the target base station 214 and the WCD 202 are supported on the air interface 205, as represented in the figure. Use of the contention-free preamble 208 helps ensure a successful handover.

When the target base station of a handover is a relay base station, such as the relay base station 114 shown in FIG. 1, operational communications relating to the handover are carried on the wireless backhaul between the relay base station and its serving base station. At the same time, the wireless backhaul shares the air interface between the relay WCD and its serving base station with other air interface communications of the relay WCD. These can include communications related to applications and/or communication sessions active on the relay WCD and or on other WCDs receiving service from the relay base station. As a result, signaling related to a handover may be subject to latency and delay that does not commonly occur on a wireline backhaul between a network base station and network elements, such as the MME of SGW, or on an X2 connection to another base station. In particular, although the WCD in the handover can make a contention-free random access request to the relay base station, the delay and latency of handover signaling on the wireless backhaul, as well as that due to sharing of the air interface of the relay WCD with other WCDs served by the relay base stations, can nevertheless increase the chances of a failed handover.

In conventional operation, when a WCD fails to acquire access to a target base station during a handover, the WCD will then attempt to regain access to the source base station. But the WCD will do so using contention-based random access. While this may be less than optimum, the use of contention-free random access with the target base station can be a sufficient hedge against handover failure in most instances to make the chance that contention-based random access with the source base station will occasionally be unsuccessful acceptable or tolerable. However, if the target base station is a relay base station, the hedge of using contention-free random access with the target base station may be less effective or efficient. That is, even with the use of contention-free random access with target base stations, the increased potential for failure to gain access to a relay target base station may result in increased instances of WCDs in handover needing to regain access to its source base station. In order to mitigate an increase of such instances, example embodiments entail providing a WCD in handover with contention-free random access with source base stations, in addition to contention-free random access with target base stations.

Figure 3A:
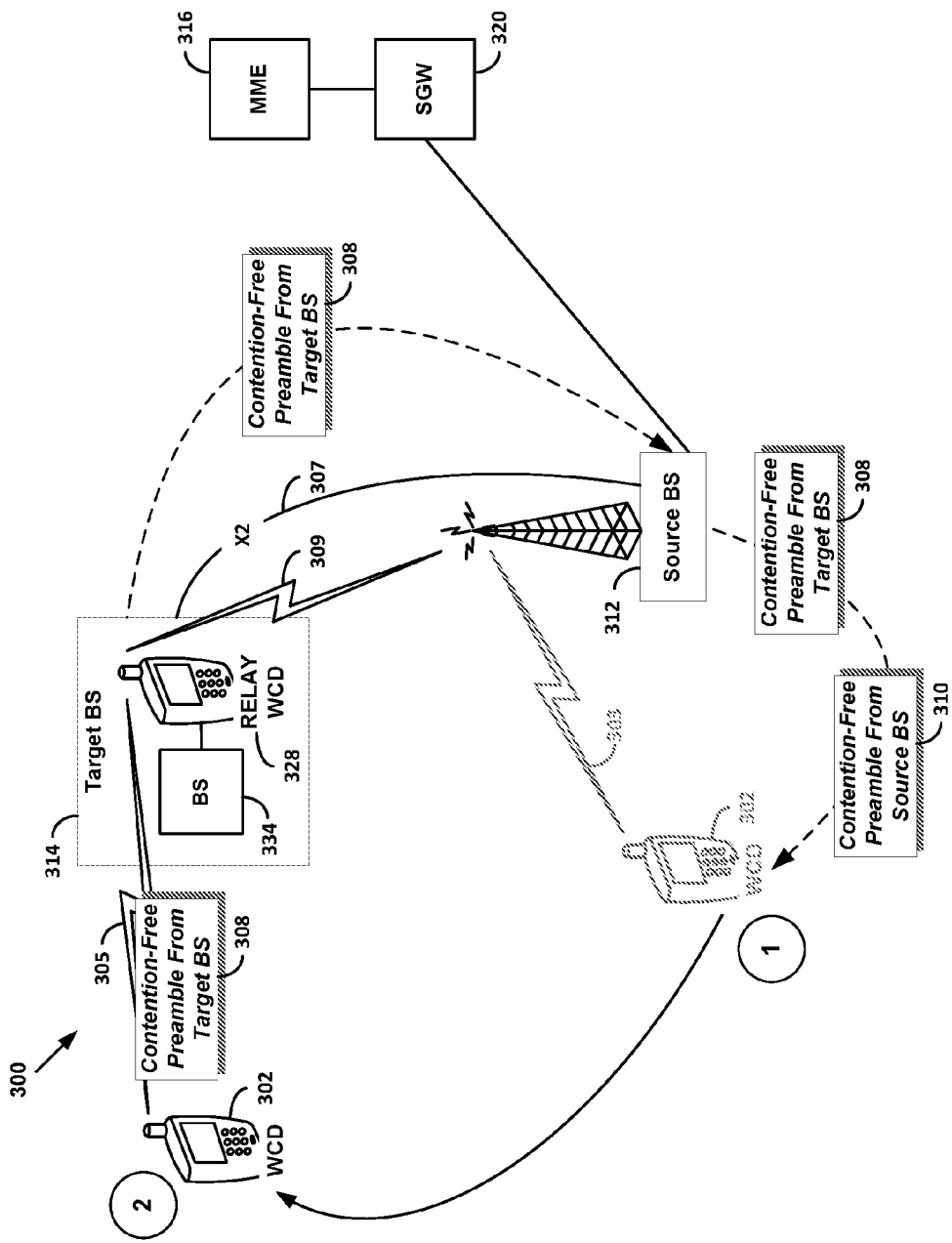
FIG. 3A illustrates handover operation and one outcome, in accordance with example embodiments.
Figure 3B:
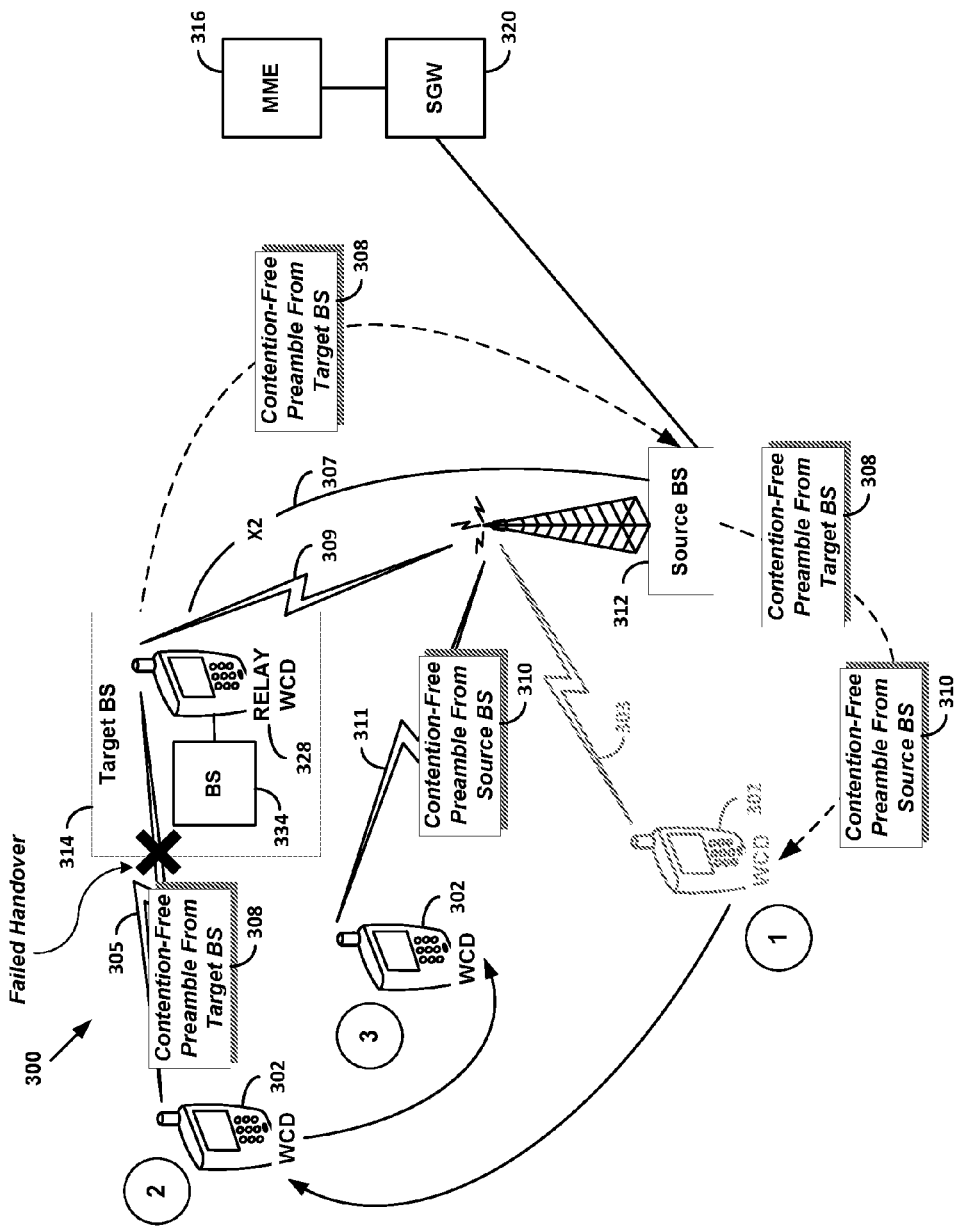
FIG. 3B illustrates handover operation and another outcome, in accordance with example embodiments.

Operation of an example handover to a target base station that is a relay base station with a wireless backhaul is illustrated in FIGS. 3A and 3B, in accordance with example embodiments. As shown, FIGS. 3A and 3B depict a wireless network 300 including a base station 312 and a relay base station 314 that includes a relay WCD 328 acting in conjunction with a small cell base station 334. By way of example, the base station 312 is the serving base station for the relay base station 328, with wireless communications carried over an air interface 309. The air interface 309, in turn, supports a wireless backhaul for the relay base station 314. As also shown, a wireless X2 link between the relay base station 314 and the base station 312 is supported over the wireless backhaul. The base station 312 is connected to a SGW 320, which in turn is connected to a MME 316. For the sake of brevity in FIGS. 3A and 3B, other LTE network elements, such as those illustrated in FIG. 1 (e.g., HSS and PGW), have been omitted. The network 300 also includes a WCD 302 shown, for the purposes of illustration, at two locations meant to represent pre-handover and post-handover operation (as well as possibly intra-handover operation). As a visual cue of the handover, the WCD 302 is depicted in faded gray lines at its pre-handover location, and in dark black lines at its post-handover location.

Also for purposes of illustration in the example of FIG. 3, the base station 312 is taken to be the source base station of the handover operation, and the relay base station 314 is taken to be the target base station of the handover operation. Thus, at the time the handover operation is initiated, designated by a circular label bearing the number "1," the source base station 312 is the serving base station of the WCD 302 (and WCD 302 is depicted at its pre-handover location); communications between the source base station 312 and the WCD 302 are supported by the air interface 303, as represented in the figure. The source base station 312 may engage in handover signaling with the relay target base station 314 via the X2 link 307. As in conventional operation, the target base station may assign a contention-free preamble 308 to the WCD 302 and convey the contention-free preamble 308 to the source base station.

In accordance with example embodiments, and unlike under conventional operation, the source base station 312 makes a determination that the target base station 314 is a relay base station. Then, in response to making the determination, the source base station will also assign (or reserver) a contention-free preamble 310 to the WCD 302, and convey both contention-free preambles 308 and 310 to the WCD 302 in a handover command, as indicated. As in conventional operation, the contention-free preamble 308 may be used by the WCD 302 in a contention-free random access request to the target base station 314. However, unlike in conventional operation, the WCD 302 will also have the contention-free preamble 310 for use in a contention-free random access request to the source base station 312 in the event that the WCD 302 fails to gain access to the target base station 314 and must therefore attempt to regain access to the source base station 312. The WCD 302 may thereby be assured contention-free random access to the source base station 312 in the event that it is needed, an eventuality that may be more likely to occur when the target base station is a relay base station (as in this example).

By way of example, FIG. 3A illustrates a case in which a contention-free random access request from the WCD 302 to the target base station 314 using the contention-free preamble 308 leads to the requested access and a successful handover. This is indicated by a circular label bearing the number "2," designating completion of the handover. After handover (represented by WCD 302 at its post-handover location), communications between the target base station 314 and the WCD 302 are supported on the air interface 305, as represented in the figure.

In the case of a successful handover, as illustrated in FIG. 3A, the WCD 302 will not need to attempt to regain access to the source base station 312 for purposes of recovery from a failed handover, so the contention-free preamble 310 will not be used by the WCD 302. In order to ensure that the contention-free preamble 310 assigned to the WCD 302 gets returned to the source base station's pool of contention-free preambles, the source base station 312 can set a timer when is assigns the contention-free preamble 310 to the WCD 302. If the source base station fails to receive a contention-free random access request including the contention-free preamble 310 from the WCD 302 before the timer expires, the source base station 312 can de-assign (or cancel the reservation for) the contention-free preamble 310 from the WCD 302 and return it to the pool. The duration of the timer could be set to an amount of time corresponding to that typical for a successful handover, or some multiple thereof. For example 1.5-2 times the typical successful completion time.

Also by way of example, FIG. 3B illustrates a case in which a contention-free random access request from the WCD 302 to the target base station 314 using the contention-free preamble 308 fails to lead to the requested access. In this case, a circular label bearing the number "2" designates contention-free random access request to the target base station 314 using the contention-free preamble 308. However, a large "X" across the air interface 305 signifies failure of the handover, as indicated. Thus, the WCD 302 then attempts to regain access to the source base station 312, as signified by a circular label bearing the number "3." In accordance with example embodiments, the WCD 302 makes a contention-free random access request to the source base station 312 using the contention-free preamble 310, which was provided to the WCD 302 based on the determination that the target base station 314 is a relay base station. After regaining access to the source base station 312, communications may resume between the WCD 302 and the source base station 312, supported on the air interface 311 as represented in the figure.

In accordance with example embodiments, a source base station can make a determination as to whether or not a target base station is a relay base station in response to initiation of a handover procedure with the target base station for handing over a WCD. For example, base stations in a wireless network may maintain a list of neighboring base stations (e.g., one or more tables or databases stored in solid state memory, magnetic disc, or the like), where each list entry (neighboring base station) may include, among other information, an indication as to whether or not it is a relay base station. Thus, when a handover of a given WCD is initiated, the serving (source) base station may consult its neighbor list to identify the target base station and determine if it is a relay base station. If the source base station, such as the base station 312, determines that the target base station, such as target relay base station 314, is a relay base station, then the source base station can responsively assign a contention-free preamble (e.g., contention-free preamble 310) to the WCD and convey it to the WCD in a handover command or other communication. As depicted in the examples of FIGS. 3A and 3B, the source base station may also convey a contention-free preamble assigned and provided by the target base station (e.g., contention-free preamble 308).

The example handover illustrated in accordance with example embodiments in FIGS. 3A and 3B represents a configuration in which the relay base station and the serving base station to which it is connected via the air interface 309 are the target and source base stations, respectively. That is, the source base station 312 also happens, by way of example, to be the donor base station for the relay target base station 314. While the operation according to example embodiments entails determination that a target base station is a relay base station with a wireless backhaul to a serving base station, it need not be the case that the source base station is also the serving base station (donor) for the relay base station. For example, the source base station for a handover could be different from the serving base station of the relay base station. In this case, the source base station and the serving base station could be communicatively connected such that handover communications between the source base station and the target relay base station would be carried via the serving base station. The communication path would thus include the communicative connection between the source base station and the serving base station and the wireless backhaul between the serving base station and the target relay base station. For such a configuration, operation in accordance with example embodiments would still entail the source base station making a determination that the target base station is a relay base station, and then, in response, assigning a contention-free preamble to the WCD and conveying it to the WCD in a handover command or other communication. The advantage of assuring the WCD of contention-free random access to the source base station should it be needed would still be achieved.

The various configurations described above could be implemented collectively or selectively in a wireless communication system. That is, a wireless communication system could implement all or some or one of the configurations described above in accordance with example embodiments.

Figure 4:
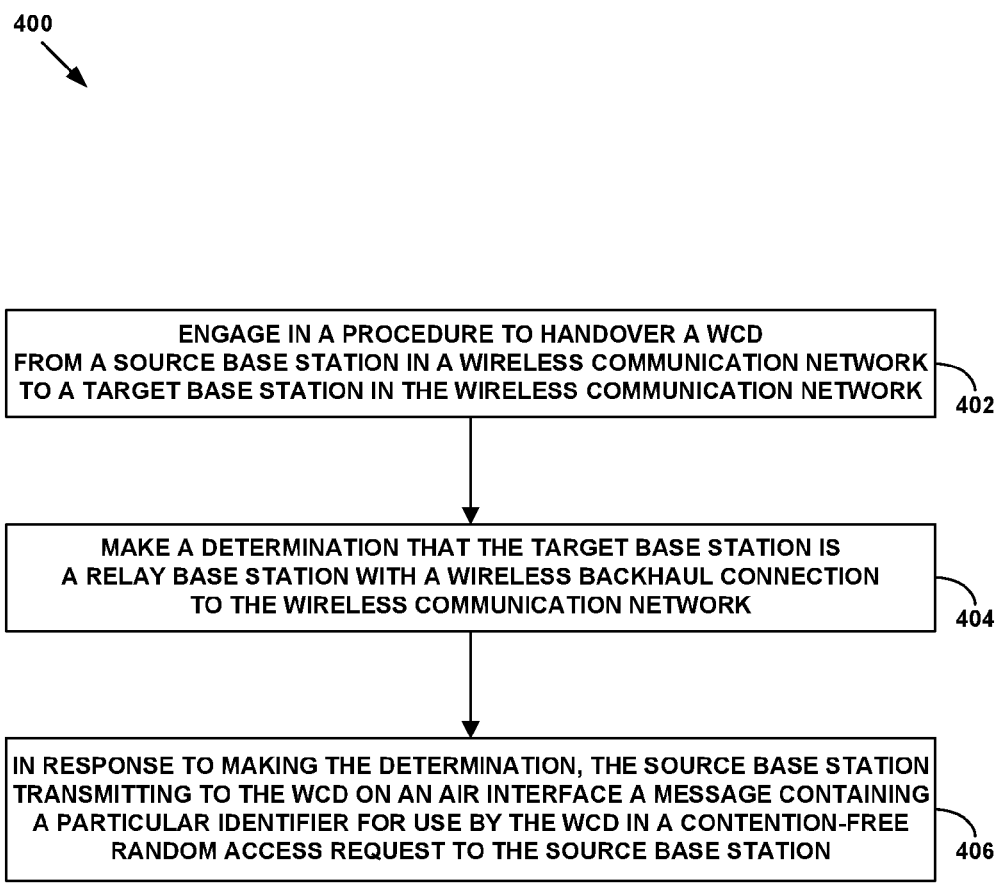
FIG. 4 is a flow chart depicting example operations in accordance with the disclosure.

FIG. 4 is a flowchart illustrating a method 400, according to an example embodiment. Illustrative methods, such as method 400, may be carried out in whole or in part by a base station, such as by the base station 312 or shown in FIG. 3. By way of example, the method 400 can be implemented as machine language instructions that can be stored on non-transitory machine-readable media (e.g., solid state memory, magnetic disk, etc.), and that when executed by one or more processors of a base station to cause the base station to carry out operations, steps, and/or functions of the method. In particular, the method 400 involves a method of handover of a wireless communication device (WCD) from a source base station in a wireless communication network to a target base station in the wireless communication network.

As shown by block 402 in FIG. 4, the method 400 entails the source base station engaging in a procedure to handover the WCD from the source base station to the target base station.

As shown by block 404 in FIG. 4, the method 400 next entails making a determination that the target base station is a relay base station with a wireless backhaul connection to the wireless communication network. In accordance with example embodiments, the wireless backhaul connection to the wireless communication network could be a wireless backhaul connection between the relay base station and a donor base station in the wireless communication network. Further, the donor base station could be the source base station or a different base station, other than the source base station.

As shown by block 406 in FIG. 4, method 400 next entails, in response to making the determination, the source base station transmitting to the WCD on an air interface a message containing a particular identifier for use by the WCD in a contention-free random access request to the source base station.

In accordance with example embodiments, the source base station can make the determination that the target base station is a relay base station. More specifically the source base station may access a neighbor list of neighboring base stations, where the neighbor list including indications of which neighboring base stations are relay base stations. The source base station may then determine that the target base station is on the neighbor list with an indication that the target base station is a relay base station.

In further accordance with example embodiments, the determination may be made at the start (e.g., initiation) of the handover, prior to the start of the handover, or at some time between the start and the completion of the handover.

In accordance with example embodiments, the buffered downlink data could include user-plane data for the WCD.

More particularly, the user-plane data for the WCD include media data. By way of example, the user-plane data in the buffer that the source base station refrains from transmitting to the target base station could be comfort-noise data or keep-alive packets.

In accordance with example embodiments, the wireless communication network may be configured for operation in a Long-Term Evolution (LTE) communication system, in which both the source and target base stations are both LTE base stations. Further, the wireless backhaul connection may be configured for support of control communications between LTE base stations according to an LTE X2 protocol. In such an LTE communication system, random access requests are identified by preambles (e.g., RACH preamble codes). More particularly, the source base station can maintain a pool of distinct preambles for use by WCDs in random access requests. The pool of distinct preambles includes (i) a first number of preambles selectable at random by WCDs for contention-based random access requests, and (ii) a second number of contention-free preambles reserved for assignment by the base station to WCDs for contention-free random access requests. With this arrangement, transmitting to the WCD on the air interface the message containing the particular identifier can entail transmitting to the WCD a message containing one of the contention-free preambles.

In accordance with example embodiments the method 400 could further entail the source base station ceasing to provide wireless access to the WCD, as part of the procedure to handover the WCD from the source base station to the target base station. And then, subsequent to ceasing to provide access, the source base station may receive a new contention-free random access request from the WCD, where the new contention-free random access request includes the particular identifier.

In accordance with example embodiments the method 400 could still further entail the source base station reserving the particular identifier for exclusive use by the WCD. And then, in response to failing to receive a contention-free random access request including the particular identifier from the WCD within a threshold amount of time after transmitting the message to the WCD, the source base station could cancel the reservation of the particular identifier for exclusive use by the WCD.

It will be appreciated that the example method and 400 could include alternate and/or additional steps, while still remaining within the scope and spirit of example embodiments herein.

Figure 5:
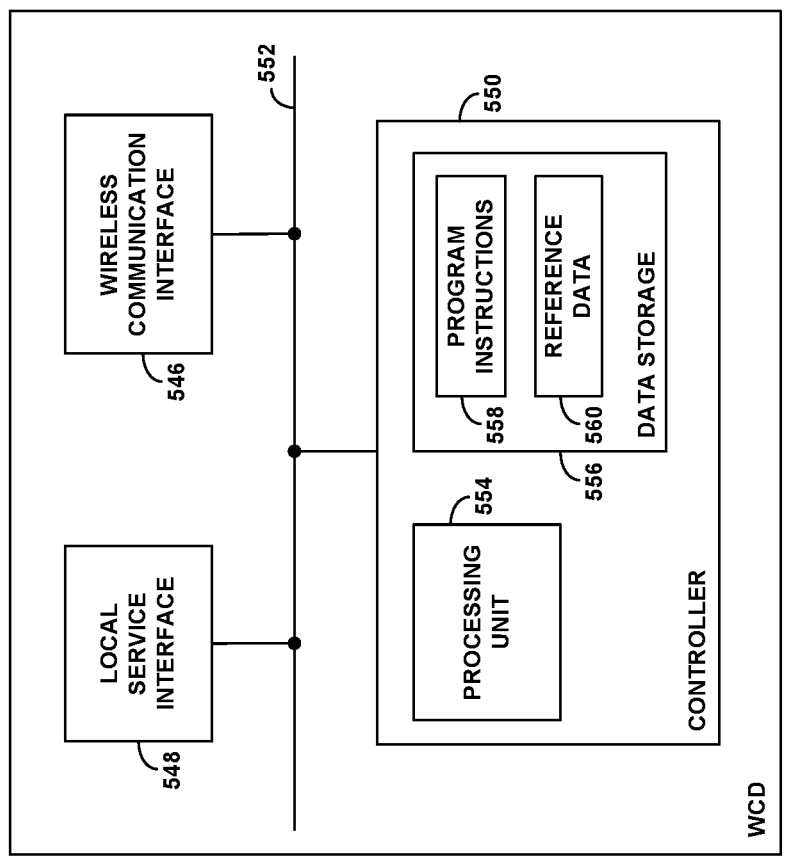
FIG. 5 is simplified block diagram of an example WCD operable in accordance with the disclosure.

FIG. 5 is next a simplified block diagram of a WCD, showing some of the components that such a device could include in accordance with an example implementation. In particular, the example WCD is configured to provide connectivity between at least one other device and the base station. Such a WCD could be a relay WCD or a hotspot/ D2D node for instance.

As shown in FIG. 5, the example WCD includes a wireless communication interface 546, local service interface 548, and a controller 550, all of which could be coupled together or otherwise interconnected by a system bus, network, or other connection mechanism 552. Further, these or other components of the WCD could be integrated together in various ways. For instance, the controller could be provided as logic on a chipset that also serves as at least part of the wireless communication interface or local service interface. And the wireless communication interface and local service interface could be combined together. Further, the WCD could include other components and take other forms. For instance, if the WCD is user operated, the WCD could include a user interface. Other examples are possible as well.

In the example WCD, the wireless communication interface 546 could be configured to engage in wireless communication with the base station that serves the WCD, via a wireless channel between the WCD and the base station. As such, the wireless communication interface could include a radio compliant with the protocol that the WCD will use for communication with the base station, such as LTE for instance, and could further include an antenna structure for transmitting and receiving via the wireless channel.

The local service interface 548 could then be configured to engage in communication directly or indirectly with one or more other devices. For example, the local interface could be configured to communicate with a small cell base station that in turn serves one or more other devices, and/or the local interface could be configured to communicate more directly with one or more other devices. Further, the local service interface could provide for wired and/or wireless communication with the one or more other devices. For instance, the local service interface could include a wireless communication interface that operates to communicate with one or more other entities over the same air interface protocol used by wireless communication interface 546 or over a different air interface protocol. (By way of example, the wireless communication interface 546 could communicate with the serving base station according to LTE, and the local service interface 548 could communicate with other devices using LTE or using WiFi.) Alternatively, the local service interface could be configured for connection with a wired link such as an Ethernet connection or other cable connection with one or more other entities.

With these interfaces, the WCD could operate to be served by, and thus communicate data to and from, its serving base station on the one hand and to communicate data to and from one or more other devices on the other hand. Thus, the WCD could function as an intermediary providing connectivity between the one or more other devices and the base station.

The controller 550, in turn, could be configured to control operation of the WCD including implementing various WCD operations described herein.

As shown by way of example, the controller could include a processing unit 554 and data storage 556. Processing unit 554 could comprise one or more general purpose processors (e.g., microprocessors) and/or one or more special-purpose processors (e.g., application specific integrated circuits or digital signal processors). And data storage 556 could comprise one or more non-transitory volatile and/or non-volatile storage components, such as magnetic, optical, or flash memory, and could hold or be encoded with program instructions 558 and reference data 560. Program instructions 558 could be executable by processing unit 554 to carry out various WCD operations described herein. And reference data 560 could include various data to facilitate carrying out the operations, such as data indicating the extent to which the WCD provides connectivity between its serving base station and one or more other devices, and mapping data that correlates various channel state reporting rates with particular extents to which the WCD provides connectivity between its serving base station and one or more other devices.

Figure 6:
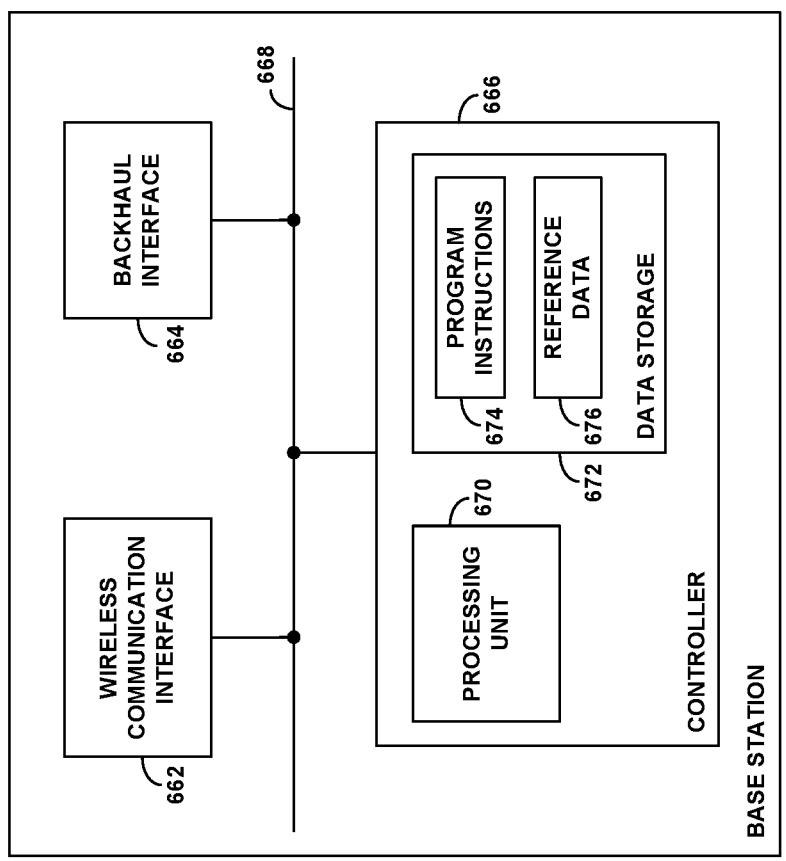
FIG. 6 is simplified block diagram of an example base station operable in accordance with the disclosure.

FIG. 6 is next a simplified block diagram of a base station (such as base station 112), showing some of the components that such an entity could include in accordance with an example implementation. In particular, the example base station is configured to act as a serving base station for a WCD, carry out steps to handover the WCD to a target base station, determine whether or not the target base station is a relay base station, and can responsively assign a contention-free preamble to the WCD and convey it to the WCD in a handover command or other communication if the target base station is determined to be a relay base station. The example base station could be a macro base station of the type that typically includes a tower top antenna structure and provides a broad range of coverage, or the base station could be a small cell base station (e.g., femtocell, mini-macro, or the like) that typically has a smaller form factor and provides a narrower range of coverage. Under LTE, the base station could be an eNodeB. Under other protocols, the base station could take other forms.

As shown in FIG. 6, the example base station includes a wireless communication interface 662, a backhaul interface 664, and a controller 666, all of which could be coupled together or otherwise interconnected by a system bus, network, or other connection mechanism 668. Further, these or other components of the base station could be integrated together in various ways.

In the example base station, the wireless communication interface 646 could be configured to engage in wireless communication with a served WCD via a wireless channel between the base station and the WCD. As such, the wireless communication interface could include a radio compliant with the protocol that the base station will use for communication with the WCD station, such as LTE for instance, and could further include an antenna structure for transmitting and receiving via the wireless channel. The backhaul interface 664 may then be a wired or wireless interface for communicating with various core network entities, such as with an SGW and MME as discussed above for instance.

The controller 666, in turn, could be configured to control operation of the base station including implementing various base station operations described herein, such as acting as a serving base station for a WCD, carrying out steps to handover the WCD to a target base station, determining whether or not the target base station is a relay base station, and providing a contention-free preamble to the WCD for contention-free random access to the source base station if the target base station is determined to be a relay base station.

As shown by way of example, the controller 666 could include a processing unit 670 and data storage 672. Processing unit 670 could comprise one or more general purpose processors (e.g., microprocessors) and/or one or more special-purpose processors (e.g., application specific integrated circuits or digital signal processors). And data storage 672 could comprise one or more non-transitory volatile and/or non-volatile storage components, such as magnetic, optical, or flash memory, and could hold or be encoded with program instructions 674 and reference data 676. Program instructions 674 could be executable by processing unit 670 to carry out various base station operations described herein. And reference data 676 could include various data to facilitate carrying out the operations, such as those described above.

Exemplary embodiments have been described above. Those skilled in the art will understand, however, that changes and modifications may be made to these embodiments without departing from the true scope and spirit of the invention.

What is claimed is:

1. A method of handover of a wireless communication device (WCD) from a source base station in a wireless communication network to a target base station in the wireless communication network, the method comprising:
   the source base station engaging in a procedure to handover the WCD from the source base station to the target base station;
   making a determination that the target base station is a relay base station with a wireless backhaul connection to the wireless communication network; and
   in response to making the determination, the source base station transmitting to the WCD on an air interface a message containing a particular identifier for use by the WCD in a contention-free random access request to the source base station,
   wherein random access requests are identified by preambles,
   wherein the source base station maintains a pool of distinct preambles for use by WCDs in random access requests, the pool of distinct preambles including (i) a first number of preambles selectable at random by WCDs for contention-based random access requests, and (ii) a second number of contention-free preambles reserved for assignment by the base station to WCDs for contention-free random access requests,
   and wherein transmitting to the WCD on the air interface the message containing the particular identifier comprises transmitting to the WCD a message containing one of the contention-free preambles.

2. The method of claim 1, wherein the wireless backhaul connection to the wireless communication network comprises a wireless backhaul connection between the relay base station and a donor base station in the wireless communication network, the donor base station being one of the source base station or a base station, other than the source base station.

3. The method of claim 1, wherein making the determination comprises:
   the source base station accessing a neighbor list of neighboring base stations, the neighbor list including indications of which neighboring base stations are relay base stations; and
   the source base station determining that the target base station is on the neighbor list with an indication that the target base station is a relay base station.

4. The method of claim 1, wherein making the determination comprises making the determination at a particular time, the particular time being one of the start of the handover, prior to the start of the handover, or a time between the start and the completion of the handover.

5. The method of claim 1, wherein the wireless communication network is configured to operate according to at least Long Term Evolution (LTE).

6. The method of claim 1, further comprising:
   as part of the procedure to handover the WCD from the source base station to the target base station, the source base station ceasing to provide wireless access to the WCD; and
   subsequent to ceasing to provide access, the source base station receiving a new contention-free random access request from the WCD, the new contention-free random access request including the particular identifier.

7. The method of claim 1, further comprising:
   the source base station reserving the particular identifier for exclusive use by the WCD; and
   in response to failing to receive a contention-free random access request including the particular identifier from the WCD within a threshold amount of time after transmitting the message to the WCD, the source base station canceling the reservation of the particular identifier for exclusive use by the WCD.

8. The method of claim 1, wherein the wireless communication network is configured to operate according to at least Long Term Evolution (LTE), and the source and target base stations are both LTE base stations, and wherein the wireless backhaul connection is configured for support of control communications between LTE base stations according to an LTE X2 protocol.

9. A base station configured for operating in a wireless communication network and for providing service to a wireless communication device (WCD), the base station comprising:

an air interface for wireless communications with one or more WCDs;
one or more processors;
memory accessible by the one or more processors; and
machine-readable instructions stored in the memory, that upon execution by the one or more processors cause the base station to carry out operations including:
engaging in a procedure to handover the WCD from the base station to a target base station of the wireless communication network,
making a determination that the target base station is a relay base station with a wireless backhaul connection to the wireless communication network, and
in response to making the determination, transmitting to the WCD on an air interface a message containing a particular identifier for use by the WCD in a contention-free random access request to the base station,
wherein random access requests are identified by preambles,
wherein the base station maintains a pool of distinct preambles for use by WCDs in random access requests, the pool of distinct preambles including (i) a first number of preambles selectable at random by WCDs for contention-based random access requests, and (ii) a second number of contention-free preambles reserved for assignment by the base station to WCDs for contention-free random access requests,
and wherein transmitting to the WCD on the air interface the message containing the particular identifier comprises transmitting to the WCD a message containing one of the contention-free preambles.

10. The base station of claim 9, wherein the wireless backhaul connection to the wireless communication network comprises a wireless backhaul connection between the relay base station and a donor base station in the wireless communication network, the donor base station being one of the base station or a different base station, other than the base station.

11. The base station of claim 9, wherein making the determination comprises:

accessing a neighbor list of neighboring base stations, the neighbor list including indications of which neighboring base stations are relay base stations; and
determining that the target base station is on the neighbor list with an indication that the target base station is a relay base station.

12. The base station of claim 9, wherein the wireless communication network is configured to operate according to at least Long Term Evolution (LTE), and the base station and target base station are both LTE base stations, wherein the wireless backhaul connection is configured for support of control communications between LTE base stations according to an LTE X2 protocol, wherein random access requests are identified by preambles.

13. The base station of claim 9, wherein the operations further include:

as part of the procedure to handover the WCD from the base station to the target base station, the base station ceasing to provide wireless access to the WCD; and
subsequent to ceasing to provide access, the base station receiving a new contention-free random access request from the WCD, the new contention-free random access request including the particular identifier.

14. The base station of claim 9, wherein the operations further include:

reserving the particular identifier for exclusive use by the WCD; and
in response to failing to receive a contention-free random access request including the particular identifier from the WCD within a threshold amount of time after transmitting the message to the WCD, canceling the reservation of the particular identifier for exclusive use by the WCD.

15. A non-transitory computer-readable medium having instructions stored thereon that, upon execution by one or more processors of a base station configured for operating in a wireless communication network and for providing service to a wireless communication device (WCD), cause the base station to carry out operations including:

engaging in a procedure to handover the WCD from the base station to a target base station of the wireless communication network;
making a determination that the target base station is a relay base station with a wireless backhaul connection to the wireless communication network; and
in response to making the determination, transmitting to the WCD on an air interface a message containing a particular identifier for use by the WCD in a contention-free random access request to the base station,
wherein random access requests are identified by preambles,
wherein the base station maintains a pool of distinct preambles for use by WCDs in random access requests, the pool of distinct preambles including (i) a first number of preambles selectable at random by WCDs for contention-based random access requests, and (ii) a second number of contention-free preambles reserved for assignment by the base station to WCDs for contention-free random access requests,
and wherein transmitting to the WCD on the air interface the message containing the particular identifier comprises transmitting to the WCD a message containing one of the contention-free preambles.

16. The non-transitory computer-readable medium of claim 15, wherein the wireless backhaul connection to the wireless communication network comprises a wireless backhaul connection between the relay base station and a donor base station in the wireless communication network, the donor base station being one of the base station or a different base station, other than the base station.

17. The non-transitory computer-readable medium of claim 15, wherein making the determination comprises:

accessing a neighbor list of neighboring base stations, the neighbor list including indications of which neighboring base stations are relay base stations; and
determining that the target base station is on the neighbor list with an indication that the target base station is a relay base station.

18. The non-transitory computer-readable medium of claim 15, wherein the wireless communication network is configured to operate according to at least Long Term Evolution (LTE), and the base station and target base station are both LTE base stations,
  wherein the wireless backhaul connection is configured for support of control communications between LTE base stations according to an LTE X2 protocol.

19. The non-transitory computer-readable medium of claim 15, wherein the operations further include:
  as part of the procedure to handover the WCD from the base station to the target base station, the base station ceasing to provide wireless access to the WCD; and
  subsequent to ceasing to provide access, the base station receiving a new contention-free random access request from the WCD, the new contention-free random access request including the particular identifier.

20. The non-transitory computer-readable medium of claim 15, wherein the operations further include:
  reserving the particular identifier for exclusive use by the WCD; and
  in response to failing to receive a contention-free random access request including the particular identifier from the WCD within a threshold amount of time after transmitting the message to the WCD, canceling the reservation of the particular identifier for exclusive use by the WCD.

* * * * *